US012754324B2

(12) United States Patent
Cohen

(10) Patent No.: US 12,754,324 B2
(45) Date of Patent: Oct. 6, 2026

(54) PROVIDING SECURE POSITIONING, NAVIGATION, AND TIMING (PNT) USING A NETWORKED CONSTELLATION OF SATELLITES

(71) Applicant: Airbus U.S. Space & Defense, Inc., Arlington, VA (US)

(72) Inventor: Clark Emerson Cohen, Washington, DC (US)

(73) Assignee: AIRBUS U.S. SPACE & DEFENSE, INC., Arlington, VA (US)

(*) Notice: Subject to any disclaimer, the term of this patent is extended or adjusted under 35 U.S.C. 154(b) by 373 days.

(21) Appl. No.: 18/514,897

(22) Filed: Nov. 20, 2023

(65) Prior Publication Data

US 2024/0168171 A1 May 23, 2024

Related U.S. Application Data

(60) Provisional application No. 63/384,494, filed on Nov. 21, 2022.

(51) Int. Cl.
*G01S 19/12* (2010.01)
*H04W 12/037* (2021.01)
(Continued)

(52) U.S. Cl.
CPC ........... *G01S 19/12* (2013.01); *H04W 12/037* (2021.01); *H04W 12/106* (2021.01); *H04W 84/18* (2013.01)

(58) Field of Classification Search
CPC ... G01S 19/12; H04W 12/106; H04W 12/037; H04W 84/18
(Continued)

(56) References Cited

U.S. PATENT DOCUMENTS 5,760,738 A * 6/1998 Kawano .................. G01S 19/02 701/476
5,812,961 A 9/1998 Enge et al.
(Continued)

FOREIGN PATENT DOCUMENTS

| | | | | |
|---|---|---|---|---|
| EP | 2330441 A1 | 6/2011 | | |
| WO | WO-2022226466 A1 * | 10/2022 | .......... | B64G 1/1085 |
| WO | 2023/212536 A1 | 11/2023 | | |

OTHER PUBLICATIONS

International Search Report and Written Opinion issued in corresponding International Application No. PCT/US2023/080586 mailed Mar. 15, 2024, all pages cited in its entirety.

*Primary Examiner* — Samarina Makhdoom
(74) *Attorney, Agent, or Firm* — BURR & FORMAN LLP

(57) ABSTRACT

A method is disclosed for providing a positioning, navigation, and timing (PNT) service using a mesh network of interconnected nodes that includes a constellation of satellites. The method includes receiving a pseudorandom noise (PRN) code with time-registration metadata at a broadcast satellite of the constellation of satellites, the PRN code with the time-registration metadata routed to the broadcast satellite from an originating node of the mesh network. The method includes time registering the PRN code based on broadcast satellite time and the time-registration metadata. The method includes modulating the time-registered PRN code onto a carrier to produce a PNT signal for the broadcast satellite. And the method includes broadcasting the PNT signal for receipt by user equipment designed to use the PNT signal and any number of other PNT signals to calculate a geographical position and user clock solution.

22 Claims, 13 Drawing Sheets

(51) Int. Cl.
*H04W 12/106* (2021.01)
*H04W 84/18* (2009.01)

(58) Field of Classification Search
USPC .................................................... 342/357.49
See application file for complete search history.

(56) References Cited

U.S. PATENT DOCUMENTS

| | | | |
|---|---|---|---|
| 5,944,770 A | 8/1999 | Enge et al. | |
| 6,373,432 B1 | 4/2002 | Rabinowitz et al. | |
| 11,073,622 B2 | 7/2021 | Cohen | |
| 11,226,416 B1 | 1/2022 | Pullen et al. | |
| 2005/0146461 A1* | 7/2005 | Pande | G01S 19/072 342/357.44 |
| 2005/0159891 A1* | 7/2005 | Cohen | G01S 19/06 701/470 |
| 2006/0224320 A1* | 10/2006 | Kim | G01S 19/11 701/472 |
| 2014/0002302 A1* | 1/2014 | Robinson | H04B 7/1855 342/357.32 |
| 2016/0011318 A1 | 1/2016 | Cohen | |
| 2017/0350985 A1* | 12/2017 | Agee | G01S 19/215 |
| 2022/0350032 A1* | 11/2022 | Gick | G01S 19/215 |

* cited by examiner

PROVIDING SECURE POSITIONING, NAVIGATION, AND TIMING (PNT) USING A NETWORKED CONSTELLATION OF SATELLITES

CROSS-REFERENCE TO RELATED APPLICATION(S)

The present application claims priority to U.S. Provisional Patent Application No. 63/384,494, entitled: Providing Secure Position, Navigation, and Timing Using a Networked Constellation of Low-Earth Orbit Satellites, filed on Nov. 21, 2022, the content of which is hereby incorporated by reference in its entirety.

TECHNOLOGICAL FIELD

The present disclosure relates generally to positioning, navigation, and timing (PNT) and, in particular, to providing a secure PNT service using a networked constellation of satellites.

BACKGROUND

The Global Positioning System (GPS) and other standard satellite-based navigation systems provide suitable positioning information enabling worldwide a determination of positioning, navigation, and timing (PNT) with a good accuracy, depending on the available GPS information and services (civil signals service, military or public signals service, etc.). The GPS signals enable distance and time computation between receiver and transmitter within a standard service that allows for three-dimensional navigation if at least four pseudoranges to different satellites are available, and if the locations and clocks of these satellites are a priori known.

GPS has become increasingly relied on by both civilian and military users, with efforts underway to improve its accuracy and availability for all users. The reliance on GPS has also made it the target of efforts to disrupt the system or PNT service it provides. These efforts may include spoofing, jamming, or even disabling GPS satellites. It would therefore be desirable to have a system and method that takes into account at least some of the vulnerabilities discussed above, as well as other possible issues. In particular, it would be desirable to have a system and method that may complement, augment or even back-up GPS or other satellite-based navigation system.

BRIEF SUMMARY

Example implementations of the present disclosure are directed to providing a positioning, navigation, and timing (PNT) service using a constellation of satellites. The present disclosure includes, without limitation, the following example implementations.

Some example implementations provide an apparatus for providing a positioning, navigation, and timing (PNT) service using a mesh network of interconnected nodes that includes a constellation of satellites, the constellation of satellites including one or more broadcast satellites, the apparatus comprising: at least one memory configured to store computer-readable program code; and at least one processing circuitry configured to access the at least one memory, and execute the computer-readable program code to cause the apparatus to at least: generate one or more pseudorandom noise (PRN) codes for the one or more broadcast satellites, the one or more PRN codes generated at an originating node of the mesh network; and at or from the originating node, map time-registration metadata for the one or more PRN codes; and route the one or more PRN codes with the time-registration metadata through the mesh network to the one or more broadcast satellites, at which the one or more PRN codes are time-registered based on broadcast satellite time and the time-registration metadata and modulated onto a carrier to produce one or more PNT signals for broadcast and receipt by a user equipment designed to use the one or more PNT signals and any number of other PNT signals to calculate a geographical position and user clock solution.

Some example implementations provide an apparatus for providing a positioning, navigation, and timing (PNT) service using a mesh network of interconnected nodes that includes a constellation of satellites, the apparatus comprising: at least one memory configured to store computer-readable program code; and at least one processing circuitry configured to access the at least one memory, and execute the computer-readable program code to cause the apparatus to at least: receive a pseudorandom noise (PRN) code with time-registration metadata at a broadcast satellite of the constellation of satellites, the PRN code with the time-registration metadata routed through the mesh network from an originating node of the mesh network to the broadcast satellite; time-register the PRN code based on broadcast satellite time and the time-registration metadata; modulate the time-registered PRN code onto a carrier to produce a PNT signal for the broadcast satellite; and broadcast the PNT signal for receipt by a user equipment designed to use the PNT signal and any number of other PNT signals to calculate a geographical position and user clock solution.

Some example implementations provide a method of providing a positioning, navigation, and timing (PNT) service using a mesh network of interconnected nodes that includes a constellation of satellites, the constellation of satellites including one or more broadcast satellites, the method comprising: generating one or more pseudorandom noise (PRN) codes for the one or more broadcast satellites, the one or more PRN codes generated at an originating node of the mesh network; and at or from the originating node, mapping time-registration metadata for the one or more PRN codes; and routing the one or more PRN codes with the time-registration metadata through the mesh network to the one or more broadcast satellites, at which the one or more PRN codes are time-registered based on broadcast satellite time and the time-registration metadata and modulated onto a carrier to produce one or more PNT signals for broadcast and receipt by a user equipment designed to use the one or more PNT signals and any number of other PNT signals to calculate a geographical position and user clock solution.

Some example implementations provide a method of providing a positioning, navigation, and timing (PNT) service using a mesh network of interconnected nodes that includes a constellation of satellites, the method comprising: receiving a pseudorandom noise (PRN) code with time-registration metadata at a broadcast satellite of the constellation of satellites, the PRN code with the time-registration metadata routed through the mesh network from an originating node of the mesh network to the broadcast satellite; time-registering the PRN code based on broadcast satellite time and the time-registration metadata; modulating the time-registered PRN code onto a carrier to produce a PNT signal for the broadcast satellite; and broadcasting the PNT signal for receipt by a user equipment designed to use the PNT signal and any number of other PNT signals to calculate a geographical position and user clock solution.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

Figure 10A:
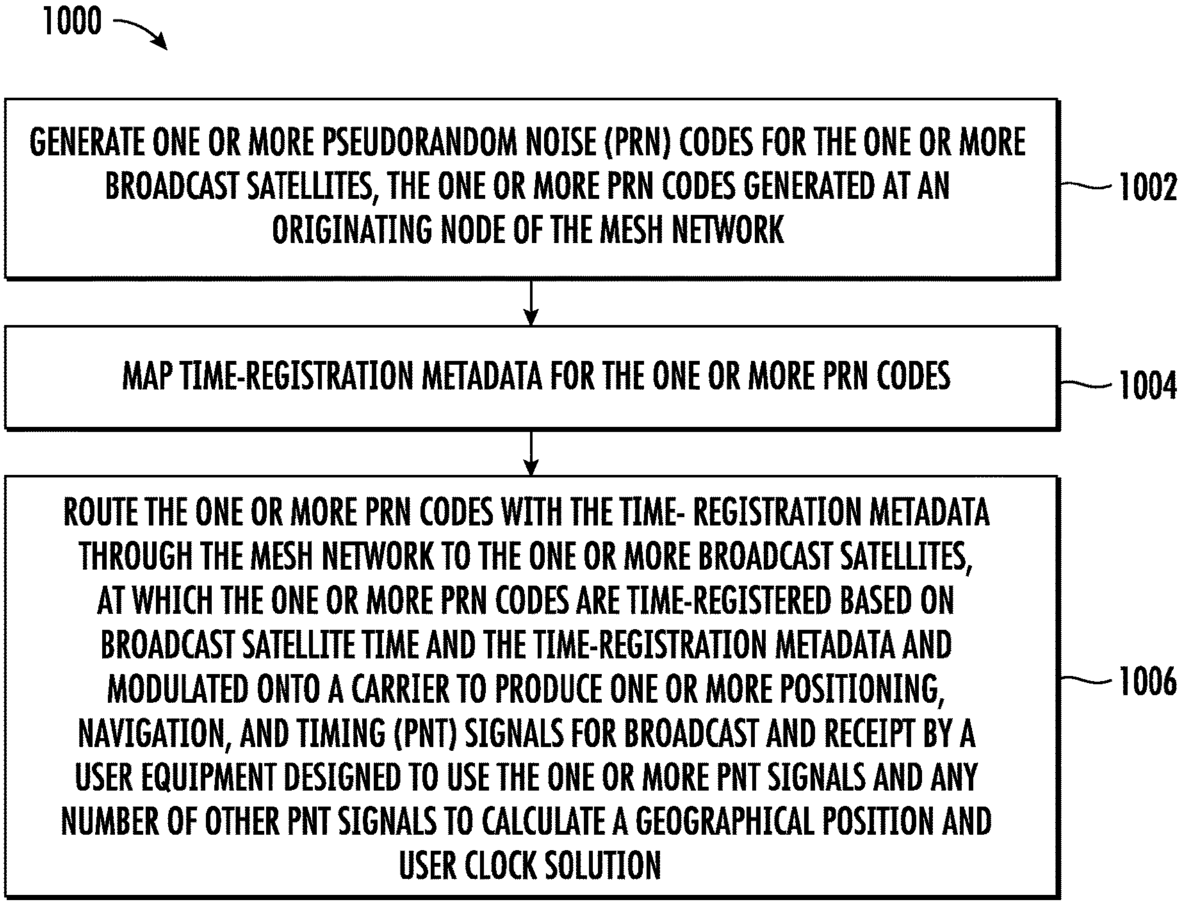
Figure 10B:
Figure 10C:
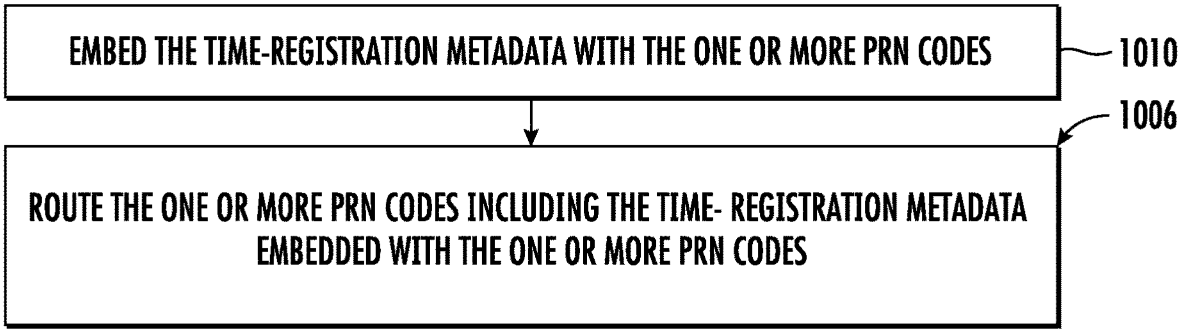
Figure 10D:
Figure 11A:
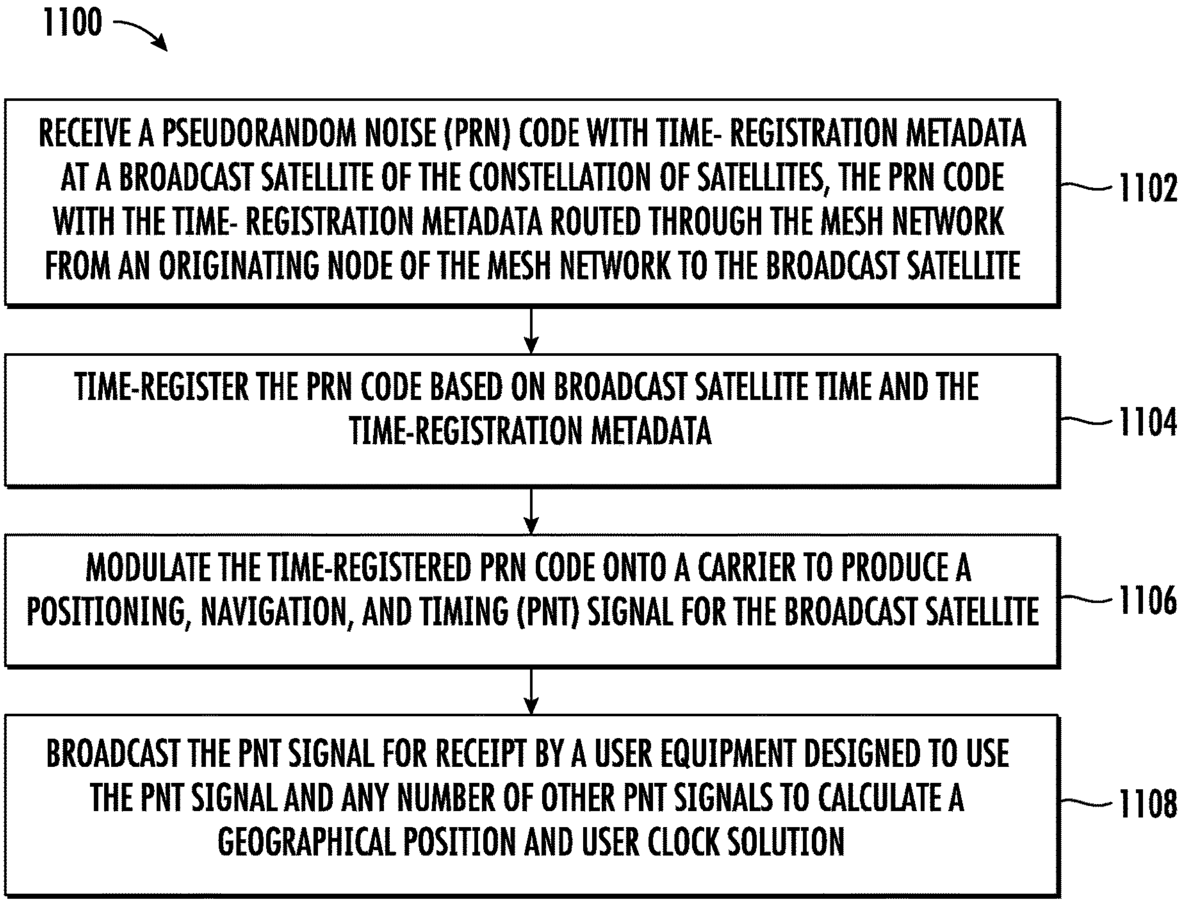
Figure 11B:
Figure 11C:
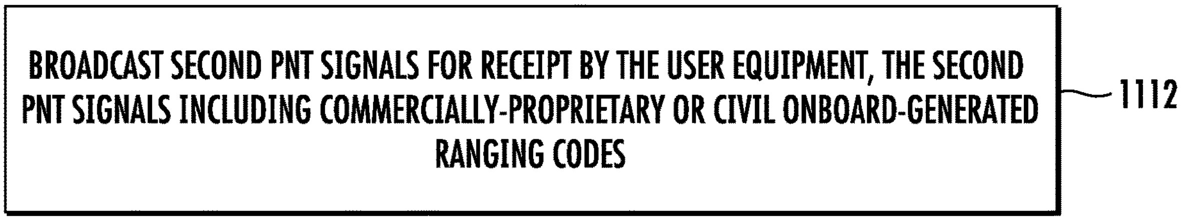

FIGS. 10A, 10B, 10C and 10D are flowcharts illustrating various steps in methods of providing a PNT service using a mesh network of interconnected nodes that includes a constellation of satellites, according to some example implementations; and FIGS. 11A, 11B and 11C are flowcharts illustrating various steps in methods of providing a PNT service using a mesh network of interconnected nodes that includes a constellation of satellites, according to some example implementations.

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," and similar terms may be at times used interchangeably.

Example implementations of the present disclosure relate generally to positioning, navigation, and timing (PNT) and, in particular, to providing a PNT service using a constellation of satellites. Example implementations will primarily be described in the context of a constellation of low-earth orbit (LEO) satellites, although it should be understood that example implementations are equally applicable to medium-earth orbit (MEO) satellites, geosynchronous-earth orbit (GEO) satellites, multi-orbit constellations, and the like. In some particular example implementations, the constellation of LEO satellites are those provided by the Transport Layer of the Proliferated Warfighter Space Architecture (PWSA) being designed and deployed by the Space Development Agency (SDA). In this regard, the PWSA is a threat-driven constellation of small satellites configured to deliver various services to military personnel from space. These services include a low-latency data transport capability, provided by a transport layer that provides a mesh network using a constellation of LEO satellites that connect to one another and to other spacecraft and ground nodes via optical inter-satellite links.

Figure 1:
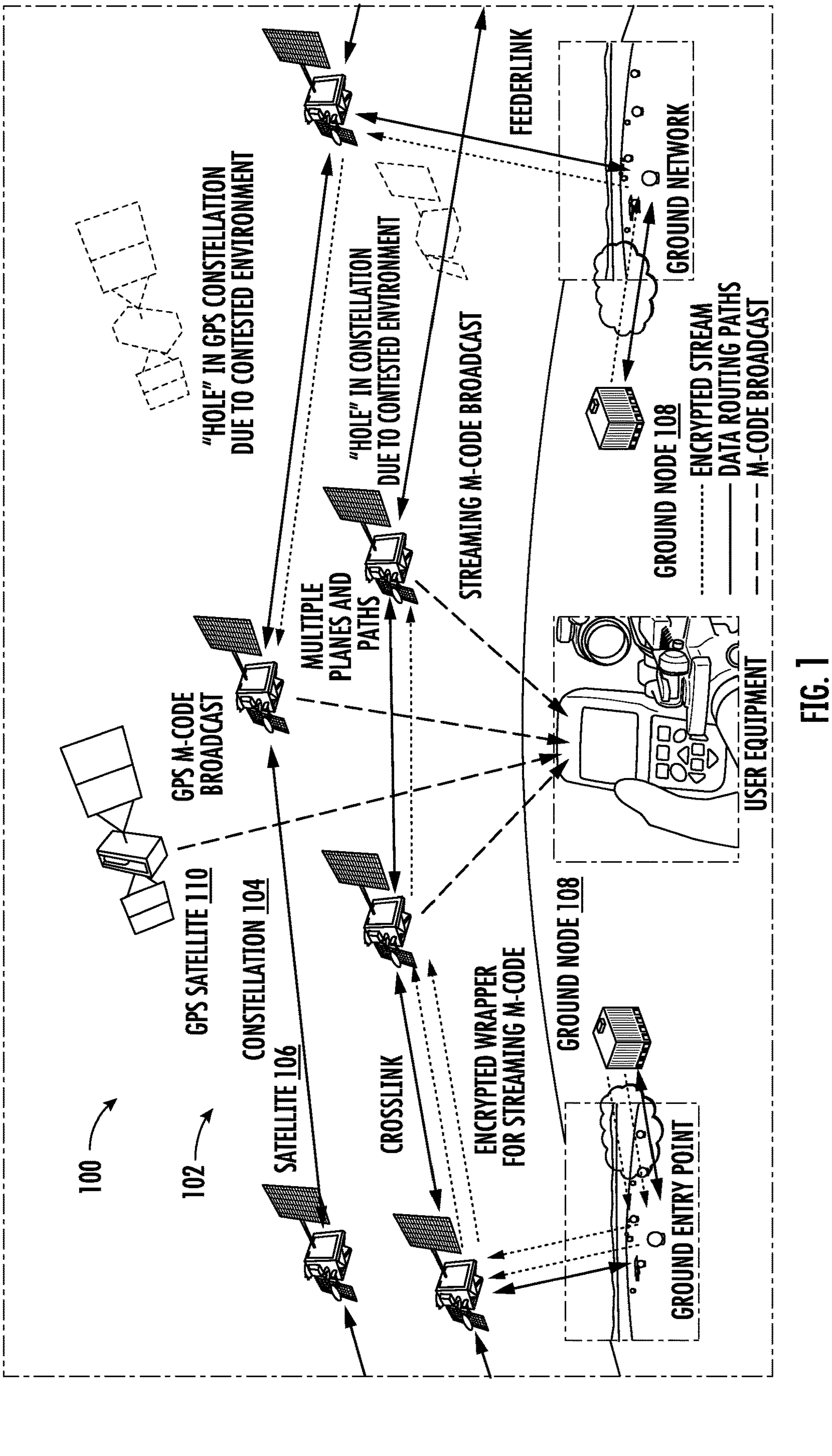
FIG. 1 illustrates a system for providing a positioning, navigation, and timing (PNT) service of a satellite-based navigation system, using a mesh network of interconnected nodes that includes a constellation of satellites that may be in low-earth orbit (LEO), according to some example implementations of the present disclosure.

FIG. 1 illustrates a system 100 for providing a positioning, navigation, and timing (PNT) service of a satellite-based navigation system, according to some example implementations of the present disclosure. As shown, the PNT service is provided using a mesh network 102 of interconnected nodes that includes a constellation 104 of satellites 106, and that may also include ground nodes 108. One example of a suitable satellite-based navigation system is the Global Positioning System (GPS) that includes a constellation of satellites (one shown as GPS satellite 110). It should be understood, however, that example implementations of the present disclosure may also be equally applicable to other satellite-based navigation systems. Similarly, example implementations will be primarily described in the context of the constellation of LEO satellites provided by the transport layer of the PWSA, but it should be understood that example implementations may be equally applicable to any of a number of other mesh networks that include satellites.

In some example implementations, the system 100 extends the mesh network capability to use military pseudorandom noise (PRN) codes used in GPS, such as the M-code and/or Y-code, for maximum forward and backward capability with GPS. In the following description, M-code is presented as the baseline broadcast signal, although it is understood that Y-code or another suitable PRN code could just as readily be streamed and broadcast. A PRN code such as M-code may serve as an end-to-end network passthrough, thereby addressing a number of security challenges.

Some example implementations of the present disclosure leverage the emergence and proliferation of a large planned M-code user equipment installed base, LEO constellations, and/or optical communications terminals (OCTs).

In some example implementations, constellation 104 of satellites 106 of the mesh network 102 may include one or more constellations originally intended as civil or commercial communication networks. Examples include OneWeb's Gen2, the European Union's Infrastructure for Resilience, Interconnectivity and Security by Satellite (IRIS$^2$), SpaceX's Starlink, Amazon's Kuiper, and Telesat's Lightspeed constellations. Although none of these example constellations is fundamentally designed for navigation use with M-code, some example implementations of the present disclosure offer a new path to support the capability for use as a deterrent to military threats against the GPS space segment. Example implementations enable latent capability in civil or commercial constellations to be transformed into an end-to-end passthrough for M-code in a way that is compatible with the M-code security architecture. The mesh network may become a means for near-instantaneous filling in for missing GPS satellites. The deterrent may extend the effectiveness of the installed base of integrated GPS user equipment and raise costs to an adversary of attacking GPS.

According to various examples, synthesis of M-code occurs not on the satellites 106 but at other, originating nodes, such as protected ground nodes 108 or other satellites in the mesh network 102. The codes are streamed from originating nodes on the ground via the transport layer network to forward-based satellites, at which point the codes are broadcast to the users. The originating nodes may also be in space. Encryption may further protect the codes during transit.

As shown in FIG. 1, protected ground nodes 108 may be configured to generate the M-code chip sequence. To each M-code chip sequence, an advanced encryption standard (AES) cipher stream may be applied (multiplied on an individual chip-by-cipher bit basis using an exclusive-or function) as the encryption. Each resulting encrypted stream, shown in dashed line, may be routed through a ground network, ground entry point (GEP) and the like to the constellation 104 of satellites 106 of the mesh network 102. Data routing paths, including the feeder links and inter-satellite links, are shown in solid line. Each satellite used for broadcast may be fed its own corresponding M-code stream. Each broadcast satellite may strip off the AES cipher stream by again multiplying a locally generated version, thereby de-encrypting the original M-code chips.

FIG. 1 depicts "holes" (missing satellites) in both the mesh network 102 and constellation of GPS satellites 110 due to the environment being contested. The strategy in some example implementations is for the combined remaining space-based resources of the mesh network and GPS to be sufficient to provide four or more M-code signals with favorable geometry.

Figure 2:
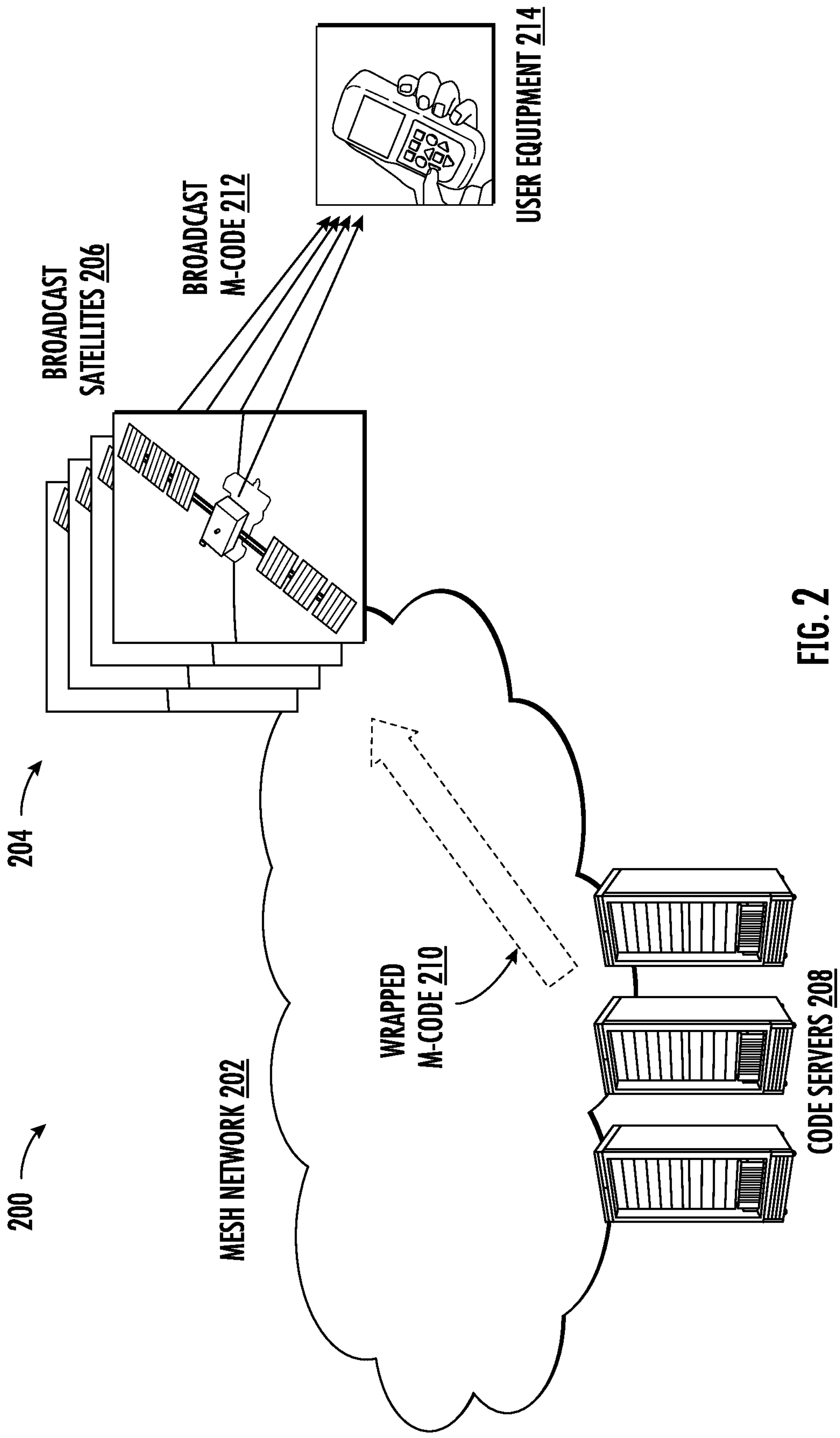
FIG. 2 is a network view of streaming M-code for resilient GPS backup, according to some example implementations.

FIG. 2 provides a network view of a system 200 that may correspond to the system 100 of FIG. 1, according to some example implementations. As shown, the system includes a mesh network 202 of interconnected nodes comprising a constellation 204 that includes broadcast satellites 206, and that also includes geographically-distributed (resilient) code servers 208. The mesh network 202 and constellation 202 of satellites 206 may correspond to the mesh network 102 and constellation 102 of satellites 106. The code servers 208 may correspond to the ground nodes 108.

In the system 200 of FIG. 2, the code servers 208 may generate M-code on the ground. A wrapped (encrypted) M-code 210 may be routed through the mesh network 202 to the satellites 206. Links between the code servers and the satellites may be radio (e.g., Ka-band) or optical. In this regard, OCTs may be capable of throughput of up to 10 Gbps or more, and embedded within the mesh network 202, providing cost-effective accommodation for the 5.115 Mcps M-code—a factor of approximately 1,000 times the needed capacity. The M-code may be unwrapped (decrypted) on the satellites, and the M-code signal 212 may be broadcast to user equipment 214.

Figure 3:
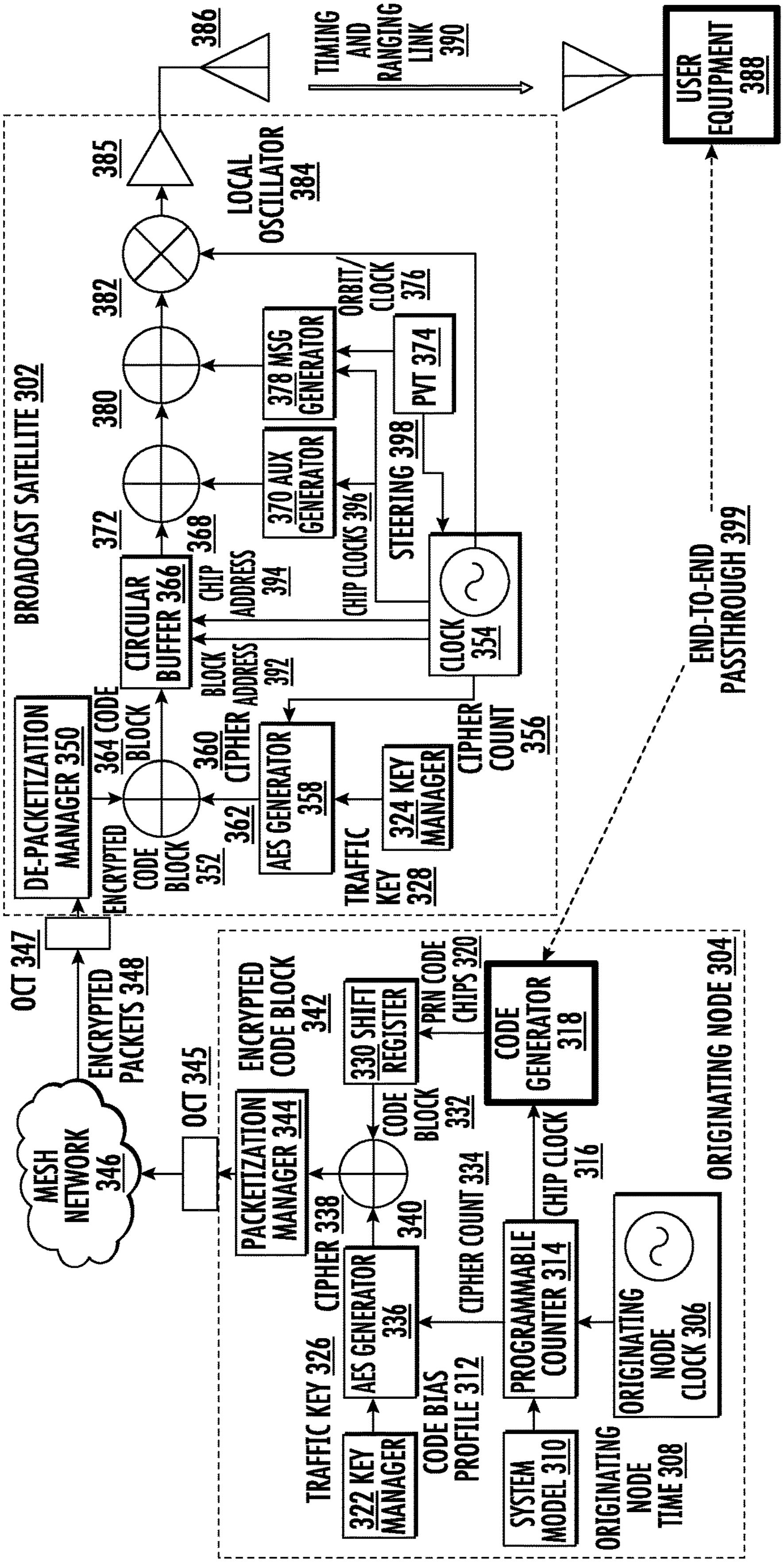
FIG. 3 is a functional block diagram of a broadcast satellite and an originating node, according to some example implementations.

FIG. 3 is a functional block diagram of a broadcast satellite 302 and an originating node 304 that may correspond to respective counterparts of satellite 106/broadcast satellites 206 and ground node 108/code servers 208, according to some example implementations. As shown, the originating node may include a clock 306 configured to provide originating node time 308 used as a time base to meter out code chips. In some examples, the clock and originating node time may be only loosely synchronized to a constellation time scale of the constellation of satellites (including broadcast satellite 302), particularly when constellation time is used to govern when each chip is broadcast.

To aid in a time registration step that may be carried out on the broadcast satellite 302, the originating node 304 may use a code bias profile to associate each PRN code chip with an intended departure time from the broadcast satellite. This association may be embedded in the stream as metadata with the PRN codes.

The originating node 304 may include a system model 310 to replicate orbit of the broadcast satellite 302, and the system model may clock along with network routing to advance a code bias profile 312 consistent with an aggregate of the network transport lag, broadcast-satellite clock bias, packet packaging overhead, and originating clock uncertainty. This code bias profile may drive a programmable counter 314 that feeds a chip clock 316 to a code generator 318 (applicable to either M-code or Y-code); and the code generator outputs PRN code chips 320.

Each stream of PRN codes 320 may be encrypted for transit to the broadcast satellite 302. A key manager 322 at the originating node 304, and a key manager 324 on the broadcast satellite 302, may apply one or more cryptographic algorithms to produce one or more traffic keys 326 and 328. In some more particular examples, the key managers may apply the Commercial National Security Algorithm Suite to produce a symmetric shared 256-bit traffic key at an originating node and on a broadcast satellite. AES-256 may be used for the encryption. In some example implementations, the key managers may employ quantum key distribution.

The originating node 304 may include a shift register 330 to clock in the PRN code chips 320 and latch out multi-chip (e.g., 256-chip) code blocks 332. The programmable counter 314 may also produce a multibit (e.g., 256-bit) cipher count 334 for an AES generator 336 operating in counter mode to produce an AES cipher 338. A bit-wise exclusive-or function 340 may multiply the code blocks by the AES cipher to obtain multi-bit-wide (e.g., 256-bit-wide) encrypted code blocks 342, and a packetization manager 344 may packetize the encrypted code blocks. In some examples, the packetization manager may build upon the ANSI/VITA V49.2 framework. The packetization manager may operate at the application layer and stream the encrypted code blocks through the mesh network 346 (that may correspond to mesh network 102, 202) as encrypted packets 348, such as via user datagram protocol (UDP). In some examples, the encrypted packets may correspond to the wrapped M-code 210 shown in the system 200 of FIG. 2.

The encrypted packets 348 may be sent through the mesh network 346 to the broadcast satellite 302, such as over one or more radio (e.g., Ka-band) or optical links 345 and 347. In some examples, a system including the broadcast satellite and the originating node 304 may operate in a "just in time" capacity to deliver the encrypted packets to the satellite as they are needed for broadcast.

On the broadcast satellite 302, a de-packetization manager 350 may receive the encrypted packets 346 from the mesh network 346 and recover the multi-bit-wide (e.g., 256-bit-wide) encrypted code blocks 352 and associated metadata. Again, this metadata may include an association of each PRN code chip with an intended departure time from the broadcast satellite. A broadcast satellite clock 354 may increment a cipher count 356 for an onboard AES generator 358 that may produce an AES cipher 360 corresponding to the associated encrypted code block for that count. A bit-wise multiplication 362 of the encrypted code block and AES cipher may recover the (unencrypted) multi-chip (e.g., 256-chip) code blocks 364.

Each code block 364 may be latched into a circular buffer 366, which may be clocked out to produce a synchronous broadcast code sequence 368. The circular buffer may be used for a broadcast satellite time registration step as the code chips may be emptied exactly when they are needed, independently of the buffer loading status.

For streaming M-code, the broadcast code sequence may have a spreading throughput of 5.115 Mbps. An auxiliary generator 370 may further modulate the broadcast code sequence via an exclusive-or (XOR) binary multiplier 372. In the case of M-code, a square wave with a subcarrier frequency of 10.23 MHz may generate a binary offset carrier (BOC) signal.

A PVT module 374 providing a computation provision based on or similar to an SDA Constellation, Speed, Time, and Range (COSTAR) 374 Orbit and Clock Determination Application (OCDA) may be used to establish a broadcast satellite position, velocity, and timing (PVT) solution. The module may further parameterize the PVT solution into a satellite orbit and clock representation 376. A message generator 378 may then convert the orbit and clock representation into message symbols. The message symbols may then be modulated onto the auxiliary generator output via a binary multiplier 380.

The signal (message symbol modulated onto the auxiliary generator output) may be converted to RF by a mixer 382 and a local oscillator reference 384 generated by the satellite clock 354. The local oscillator reference may have an upconverted carrier frequency, which in some examples may be in L-band, especially if the digital output is streaming M-code. In some examples, it may be desirable to have the broadcast code sequence phase locked to (coherent with) the carrier. This result may be enabled by deriving both broadcast satellite time and the local oscillator from the same clock.

A low pass filter upstream of the mixer (not shown), and/or a band pass filter downstream of the mixer (not shown), may limit spurious emissions. A power amplifier 385 may also include pre- and post-band pass filtering. The resulting signal may be broadcast via an antenna 386 to a user equipment 388 (that may correspond to user equipment 214). In this regard, modulated code that may be upconverted to L-band may be subsequently broadcast to the user equipment via a free space timing and ranging link 390. In some examples, the user equipment may be a standard M-code GPS receiver that is compatible with the constellation's orbit and clock.

According to some examples, the broadcast satellite clock 354 may be configured to synthesize two time scales, namely, network time and broadcast satellite time. Network time may be synchronized to the mesh network 346 and arrival of encrypted packets 348. Network time may be the source of the cipher count 356, and a block address clock 392 to latch in the circular buffer 366. Broadcast satellite time may be more suited to navigation functions and may be closely, though not perfectly, aligned with the constellation time scale. Broadcast satellite time may serve as a reference for the satellite's own timing and ranging measurements for its PVT solution. Broadcast satellite time may also be the source of a chip address clock 394 provided to the circular buffer and chip clocks 396 for the auxiliary generator 370 and message generator 378.

In some examples, network time provided by the satellite clock 354 may update when the encrypted packets 348 for a new encrypted code block arrive at the satellite 302. In concert, the cipher count 356 may update to the value associated with that encrypted code block as indicated in the metadata.

In some examples, the satellite PVT solution established by the PVT module 374 may include an estimate of the broadcast-satellite clock bias, which may be defined as the difference between broadcast satellite time and constellation time. In this regard, the broadcast-satellite clock bias may be used to generate a clock steering command 398. The broadcast-satellite clock bias may be applied to the satellite clock 354 to null out the bias over time, thereby aligning broadcast satellite time with constellation time.

Figure 4:
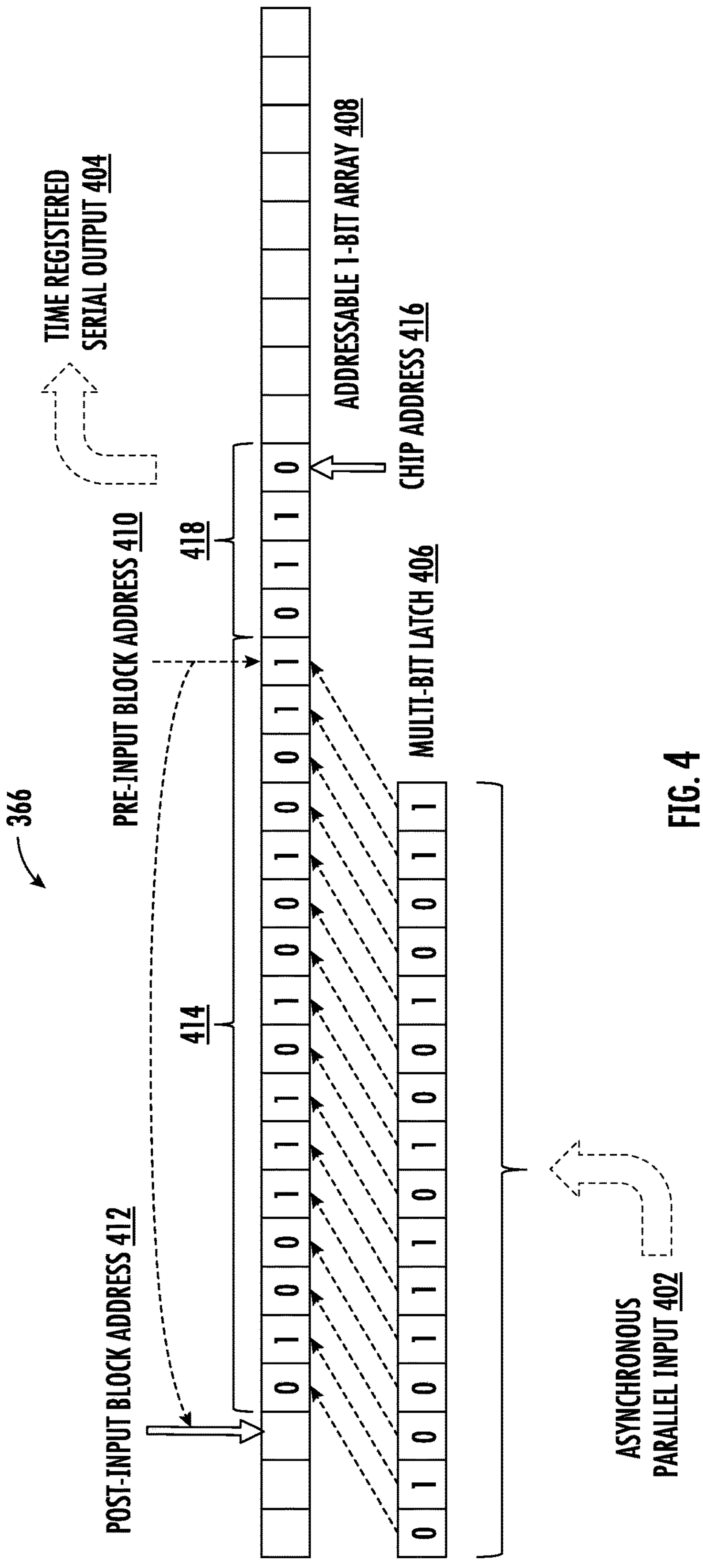
FIG. 4 shows a detailed diagram of a circular buffer for a normal block input update, according to some example implementations.

FIG. 4 illustrates the circular buffer 366, according to some example implementations. The circular buffer enables multi-bit (e.g., 256-bit) code blocks 364 to be loaded in parallel asynchronously with respect to network time, and emptied out serially and synchronously with respect to broadcast satellite time. In some examples, the code blocks may form an asynchronous parallel input 402 to the circular buffer, while a time registered serial output 404 of the circular buffer may produce the broadcast code sequence 368. The leading edge of the clock associated with the block address 392 may latch the code block 364 into a multi-bit (e.g., 256-bit) latch 406. The trailing edge of the clock may then latch the multi-bit latch output into an equally wide span of an addressable 1-bit circular array 408.

In some examples, two addresses may be employed to organize the circular buffer 366, the first providing a block-by-block input address and the second a chip-by-chip output address. A block input address may point to the first empty bit to the left in the 1-bit circular array 408. Accordingly, a pre-input block address 410 may point to the first empty bit to the left of the next code block 364. After input of the code block, the block address may be updated with a post-input block address 412. Also shown are the multiple (e.g., 256) latched chips 414. The output of the buffer is given by a chip address 416. The chip address may be updated to the left by the chip address clock 394 (derived from broadcast satellite time) and point to the occupied bit containing the current chip being output from the circular buffer. The remaining four chips 418 to be output from the previous code block 418 are also shown.

Figure 5:
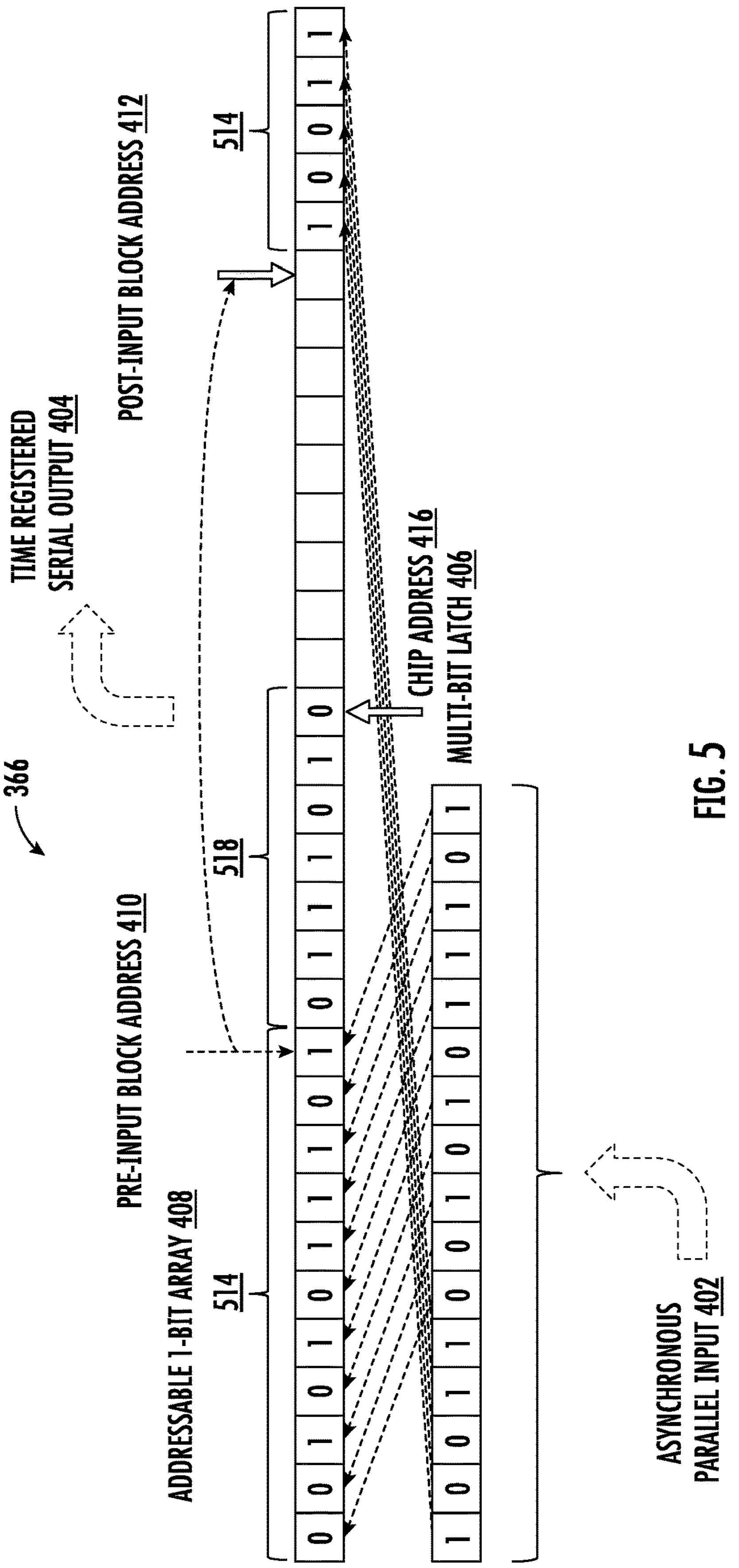
FIG. 5 shows a detailed diagram of the circular buffer for a special case split block input update, according to some example implementations.

FIG. 5. illustrates a corner case in which a code block 364 may be split across the circular buffer's linear representation. Notwithstanding the apparent split, the code block may remain contiguous within the buffer's circular representation. The input and output remain the asynchronous parallel input 402 and the time registered serial output 404. The pre-input block address 410 and the post-input block address 412 may continue to point to the first empty bit to the left in the 1-bit circular array. And the chip address 416 may continue to point to the occupied bit containing the current chip being output from the buffer. Logic for this corner case may be included in the circular buffer 366 to handle split loading of the 1-bit array 408. The latched chips 514 from the current code block are shown at the time of loading, along with the remaining seven chips 518 to be output from the previous code block.

In some examples, the circular buffer 366 may be empty when the input 412 and output 416 addresses are equal. In some of these examples, the time-registered serial output 404 may be temporarily superseded by random or pseudo-random chips. The addressable 1-bit array 408 may be sized to accommodate multiple code blocks 364 in case the streaming is anticipated to advance ahead of real time.

Figure 6:
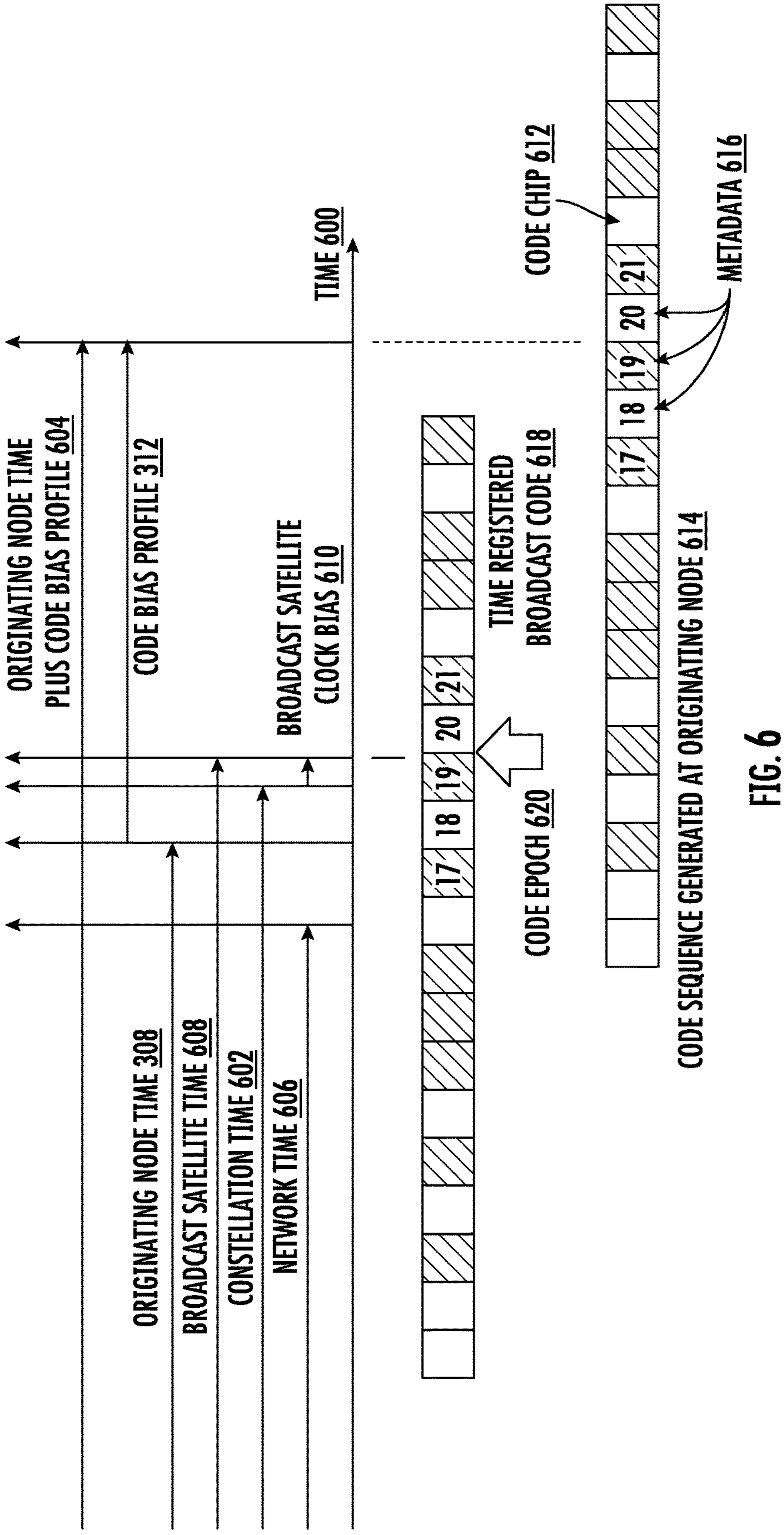
FIG. 6 illustrates how a broadcast code may be time registered relative to a broadcast satellite clock in part using metadata from the originating node, according to some example implementations.

FIG. 6 illustrates time scales that may be applicable to the time registration step, according to some example implementations. An objective of the time registration step may be to have specific PRN chips broadcast in synchronization with satellite time. Registration may be carried out with coarse and fine components. The metadata may enable the coarse component, which maps each chip to its defined temporal slot. The satellite clock aligning the broadcast to satellite time may enable the fine component.

The time scales are shown on a common time 600 axis. Constellation time 602 represents the constellation time scale, aggregating clocks of the satellites in the constellation. As mentioned in the description for FIG. 3, the originating node time 308 plus the code bias profile 312 may yield a sum 604 which leads the time scales employed on the satellite. Network time 606 may be synchronized to the mesh network and arrival of encrypted packets, and broadcast satellite time 608 is used for timing and ranging. In some examples, the circular buffer 366 may enable PRN code chips to straddle network time and broadcast satellite time. The broadcast-satellite clock bias 610 may be given by satellite time relative to constellation time. This quantity may be estimated on board the satellite and used for the clock steering command 398 to steer the satellite clock toward constellation time.

In some examples, an individual code chip 612 or code sequence generated at originating node 614 may be combined with metadata 616 so as to map the broadcast satellite PRN code chips to their designated time slots. In some examples, the metadata may be compressed to minimize network bandwidth. The time-registered broadcast code 618 may be generated according to the satellite clock and code epoch 620 alignment, defined in this example as the edge between code chips 19 and 20.

Figure 7:
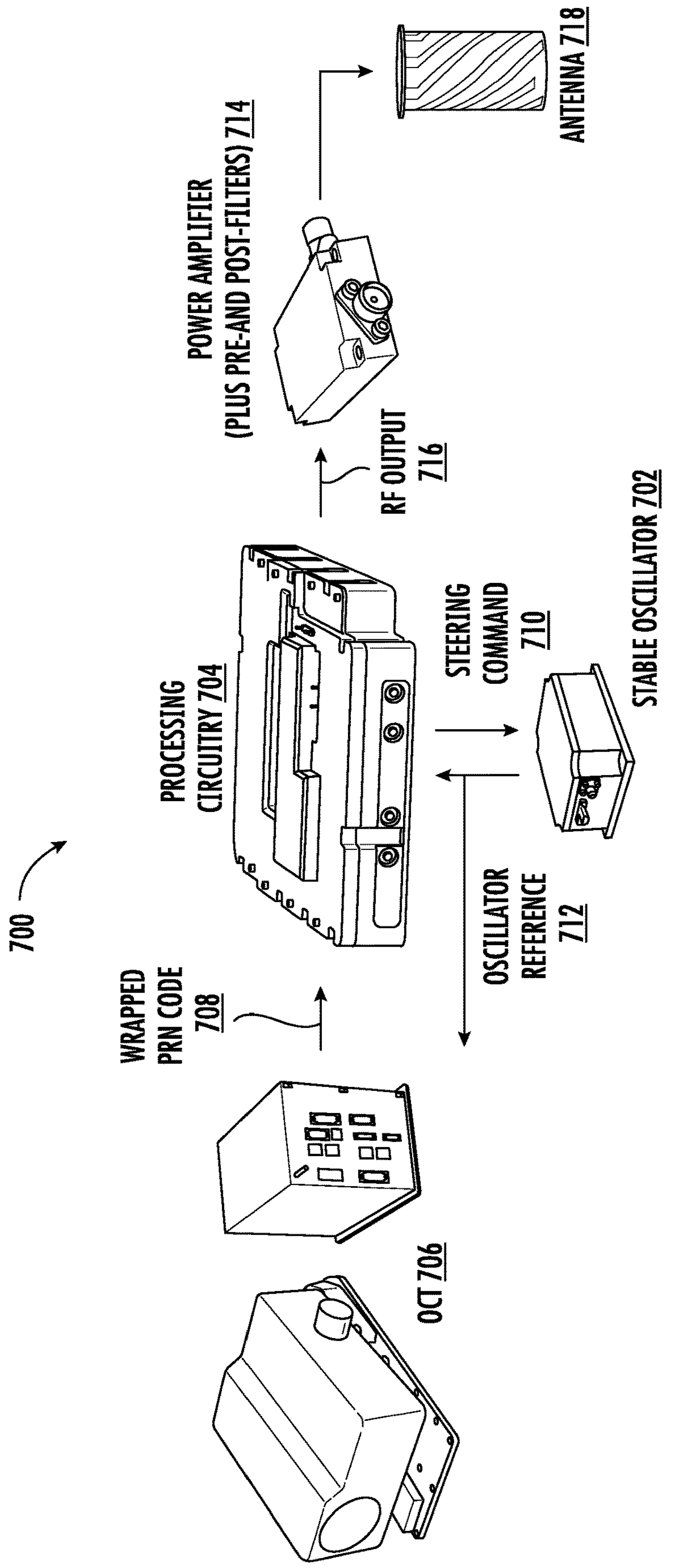
FIG. 7 illustrates a low-size, weight, and power (SWaP) spacecraft PNT payload subsystem for a navigation/communication (Nav/Com) satellite, according to some example implementations.

FIG. 7. illustrates a payload 700 of a broadcast satellite 106, 206, 302, according to some example implementations. As shown, the payload may include a stable oscillator 702 to serve as a frequency standard. The frequency standard may correspond to that embedded in the broadcast satellite clock 354. The payload may also include processing circuitry 704, which may correspond to components of the broadcast satellite 302, including the key manager 324, de-packetization manager 350, AES generator 358, bit-wise multiplication 362, circular buffer 366, auxiliary generator 370, XOR binary multiplier 372, PVT module 374, message generator 378, binary multiplier 380 and mixer 382. In some examples the processing circuitry may implement a software-defined radio (SDR). A SDR or similarly based payload may be agile in that the payload may be capable of synthesizing a variety of PRN codes; and in some examples, an on-orbit reprogrammable PNT signal generator may be used. In some examples, AES, Simon or Speck onboard-generated codes may be generated and broadcast for specialized military purposes. The reprogrammable payload may also be capable of supporting streaming M-code (or Y-code), thereby increasing military user equipment installed base compatibility. In some example implementations, the payload may also be able to realize a dual-use configuration by reprogramming processing circuitry to broadcast civil or commercially proprietary codes.

The processing circuitry may be sourced by an OCT 706, which may correspond to OCT 347, and which may provide wrapped PRN codes 708 (e.g., wrapped M-codes 210, encrypted packets 348) to the processing circuitry. Leveraging the OCT may also help increase military user equipment installed base compatibility. The stable oscillator may receive a steering command 710, which may correspond to clock steering command 398, from the processing circuitry, and direct an oscillator reference signal 712, whose nominal frequency in some examples may be selected as 10 MHz, to both the OCT and the processing circuitry. A power amplifier 714, which may correspond to power amplifier 385, may amplify an RF output 716 of the processing circuitry, and may also pre-filter and/or post-filter the RF output. The amplified RF signal may be fed to an antenna 718, which may correspond to antenna 386, such as an isoflux antenna, for broadcast to user equipment.

As derived from being hosted on satellites 106, 206, 302, such as those provided by the LEO transport layer of the PWSA, the streaming capability of the payload 700 may complement, augment, and back up GPS, with corresponding military user equipment compatibility and security benefits. It should be understood, however, that the payload and streaming architecture may also be accommodated on commercial constellations. In this regard, the payload may be a high technology readiness level (TRL) solution with preference for commercial off-the-shelf (COTS) devices with a space pedigree that could also be hosted on an authorized commercial constellation with multiple, agile, dual-use configurations.

Briefly returning to FIG. 3, in some examples, a commercial network may be treated as an end-to-end passthrough 399 to support streaming M-code. At least some if not all the components may be treated with commercial security standards, in some examples with the exception of the code generator 318 (the streaming source) and the user equipment 388 (the streaming destination). In some of these examples, the code generator and user equipment may operate under government security standards. Even though the mesh network passthrough may be a commercial constellation, some examples of the present disclosure offer streaming M-code to rapidly field cost-effective new PNT resiliency for a warfighter at scale.

Figure 8:
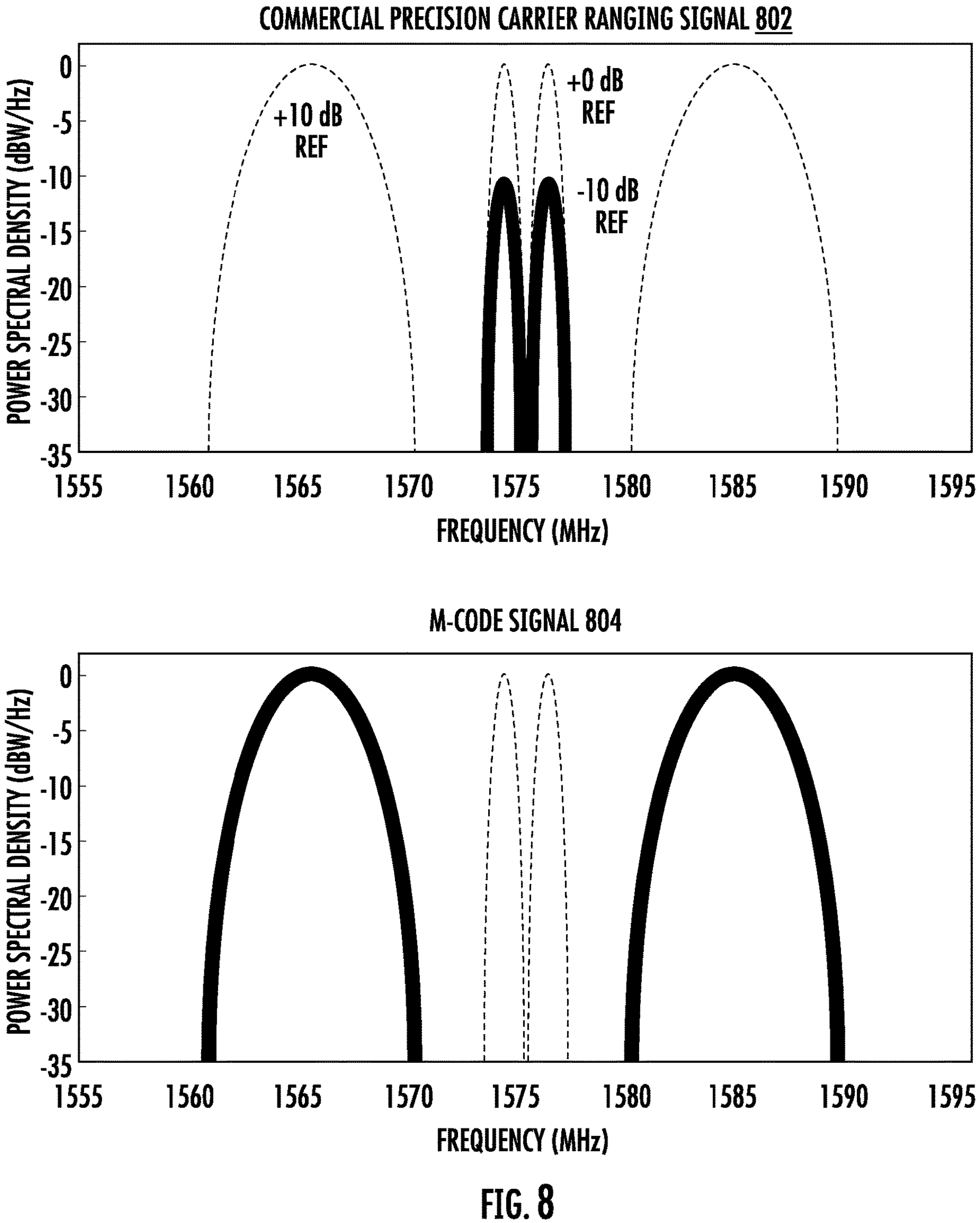
FIG. 8 shows an agile payload enabling a narrow band, low-power signal transition to higher-power, broader band M-code on demand, according to some example implementations.

FIG. 8 illustrates how some example implementations may fulfill both peacetime and wartime missions using existing or planned user equipment. In peacetime, a narrowband, low-power timing and ranging signal 802 may be broadcast. The carrier phase component of this signal broadcast from LEO satellites may enable GPS users to obtain sub-decimeter-level accuracy and integrity for safety of life performance. In wartime, the same satellite payload may broadcast a streaming M-code signal 804 with wider bandwidth and at much higher power. In some examples, transition between the two modes may be nearly instantaneous.

In some examples, peacetime signals generated by the satellite payload may include a commercial signal, which may be based on a proprietary (closed) code similar to GPS L1C and L5 except that the precision carrier signal may be modulated with a proprietary PRN code based on AES. Additionally or alternatively, for example, the peacetime signals may include a proprietary signal as above but that may be backed off in power, such as in a manner as described in PCT Patent Application Publication No. WO 2023/212536, entitled: High-Performance GNSS Using a LEO Constellation Spectrum Underlay, published Nov. 2, 2023, the content of which is incorporated by reference in its entirety. In another example, additionally or alternatively, the peacetime signals may include an open signal that may be consistent with GPS L1C, L2C, and L5.

Figure 9:
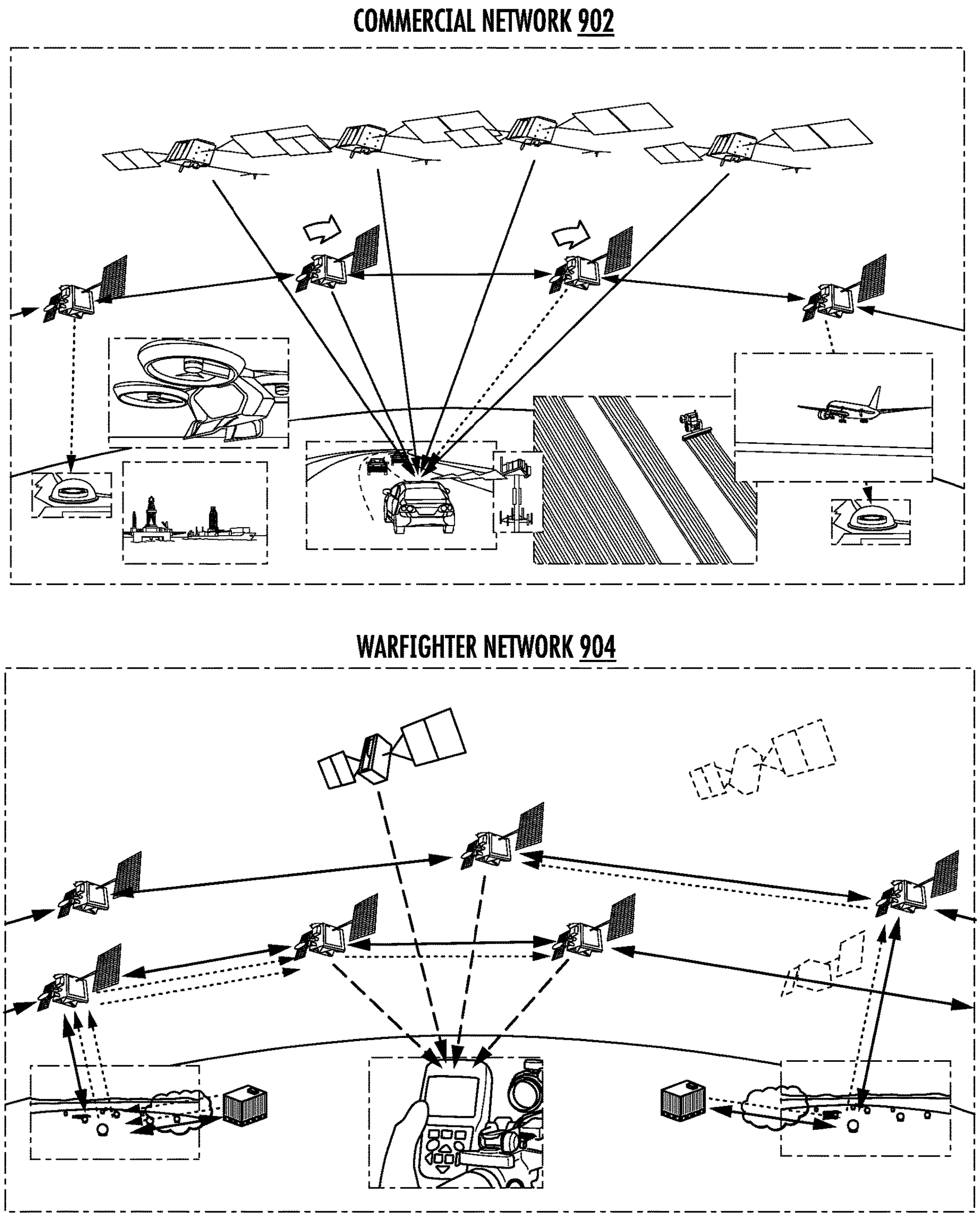
FIG. 9 depicts views of a commercial Nav/Com constellation with a military passthrough, according to some example implementations.

FIG. 9 illustrates a combined view of a commercial network 902 and a warfighter network 904, according to some example implementations. For the commercial (peacetime) network, LEO rapid angle motion may enable carrier integer cycle ambiguities to be resolved within seconds with high confidence. Applications may include autonomous vehicles, unmanned aerial vehicles, air taxis, precision landing of aircraft, precision agriculture, and offshore platform control.

A dual-use commercial constellation of satellites may support multiple phases of a conflict, each offering enhanced PNT resiliency to the user base. The following table provides a view of the constellation network configuration across each conflict phase. In some examples, the network may be capable of transitioning virtually instantaneously among the models.

| Phase | Operating Model | Operational Bands | Codes Supported | Broadcast Power | PNT Resiliency Objective |
|---|---|---|---|---|---|
| Peacetime | Commercial | L1, L5 | Proprietary | <4 W | Safety of Life Availability |
| Conflict | Military | L1, L2 | Streaming M (or Y) | 10 to 20 W | User Equipment Compatibility at Scale |
| Stabilization | Military | L1, L2 | Streaming M (or Y) | as needed | Rapid GPS Reconstitution |
| Stabilization | Civil Reserve | L1, L2, L5 | Open | about 4 W | Critical Infrastructure Continuity |

The business model for the constellation may be readily adaptable to circumstances. In peacetime, the commercial constellation may provide a precision safety of life availability PNT service to a paying subscriber base. During a conflict, the customer becomes the military, wherein the constellation may be repurposed to enable the existing installed base of M-code receivers to continue to operate in the presence of an anti-satellite threat. Post conflict, during the stabilization phase, the customer may become the government, wherein rapid GPS reconstitution may be needed in reserve for the global installed base of GPS military user equipment, critical infrastructure, and the approximately six billion GPS civil/commercial user devices.

Some example implementations of the present disclosure enable an M-code passthrough to be hosted on a commercial constellation network, leveraging the entire installed base of GPS military user equipment. Accordingly, such a network may provide asymmetric advantage against an anti-satellite counterspace threat. If the dual-use nature of the network is known to the public, then the network may serve as a deterrent to anti-satellite threats. If the government chooses to classify the dual-use nature of the network, then the network may serve as a source of strategic surprise and asymmetric advantage against anti-satellite threats.

FIGS. 10A-10D are flowcharts illustrating various steps in a method 1000 of providing a positioning, navigation, and timing (PNT) service using a mesh network of interconnected nodes that includes a constellation of satellites, the constellation of satellites including one or more broadcast satellites, according to some example implementations. The method includes generating one or more pseudorandom noise (PRN) codes for the one or more broadcast satellites, the one or more PRN codes generated at an originating node of the mesh network, as shown at block 1002 of FIG. 10A. The method includes, at or from the originating node, mapping time-registration metadata for the one or more PRN codes, as shown at block 1004. And the method includes routing the one or more PRN codes with the time-registration metadata through the mesh network to the one or more broadcast satellites, as shown at block 1006. At the one or more broadcast satellites, the one or more PRN codes are time-registered based on broadcast satellite time and the time-registration metadata and modulated onto a carrier to produce one or more PNT signals for broadcast and receipt by a user equipment designed to use the one or more PNT signal and any number of other PNT signals to calculate a geographical position and user clock solution.

In some examples, the one or more PRN codes are generated at block 1002 at the originating node that is located on the ground.

In some examples, the one or more PRN codes that are generated at block 1002 are Global Positioning System (GPS) M-code or Y-code.

In some examples, the one or more PRN codes are generated at block 1002 based on a system model used to replicate an orbit and clock of the one or more broadcast satellites. In some of these examples, the method 1000 includes routing the one or more PRN codes with the time-registration metadata at block 1006 includes metering the one or more PRN codes with the time-registration metadata for receipt at the one or more broadcast satellites just in time for broadcast, as shown at block 1008 of FIG. 10B.

In some examples, the method 1000 further includes embedding the time-registration metadata with the one or more PRN codes, as shown at block 1010 of FIG. 10C. In some of these examples, the one or more PRN codes are routed at block 1006 including the time-registration metadata embedded with the one or more PRN codes.

In some examples, the method 1000 further includes encrypting the one or more PRN codes with the time-registration metadata before the one or more PRN codes with the time-registration metadata are routed to the one or more broadcast satellites at block 1006, as shown at block 1012 of FIG. 10D.

In some examples, the constellation of satellites including the one or more broadcast satellites to which the one or more PRN codes are routed at block 1006 is a low-earth orbit (LEO), medium-earth orbit (MEO), geosynchronous-earth orbit (GEO), or multi-orbit constellation.

FIGS. 11A-11C are flowcharts illustrating various steps in a method 1100 of providing a positioning, navigation, and timing (PNT) service using a mesh network of interconnected nodes that includes a constellation of satellites, according to some example implementations. The method includes receiving a pseudorandom noise (PRN) code with time-registration metadata at a broadcast satellite of the constellation of satellites, the PRN code with the time-registration metadata routed through the mesh network from an originating node of the mesh network to the broadcast satellite, as shown at block 1102 of FIG. 11A. The method includes time-registering the PRN code based on broadcast satellite time and the time-registration metadata to align with the constellation time scale, as shown at block 1104. The method includes modulating the time-registered PRN code onto a carrier to produce a PNT signal for the broadcast satellite, as shown at block 1106. And the method includes broadcasting the PNT signal for receipt by a user equipment designed to use the PNT signal and any number of other PNT signals to calculate a geographical position and user clock solution, as shown at block 1108.

In some examples, the PRN code that is received at block 1102 is Global Positioning System (GPS) M-code or Y-code.

In some examples, the PRN code with the time-registration metadata as received at block 1102 is encrypted. In some of these examples, the method 1100 further includes decrypting the PRN code with the time-registration metadata before the PRN code is time-registered (at block 1104) and modulated onto the carrier to produce the PNT signal (at block 1106), as shown at block 1110 of FIG. 11B.

In some examples, the PNT service is dual-use, and the method 1100 further includes broadcasting second PNT signals for receipt by the user equipment, the second PNT signals including commercially-proprietary or civil onboard-generated ranging codes, as shown at block 1112 of FIG. 11C.

In some examples, the PRN code and the carrier are coherently synchronized to each other.

In some examples, the constellation of satellites including the broadcast satellite at which the PRN code is received at block 1102 is a low-earth orbit (LEO), medium-earth orbit (MEO), geosynchronous-earth orbit (GEO), or multi-orbit constellation.

According to example implementations of the present disclosure, the system 100 and its components may be implemented by various means. Means for implementing the system and its components may include hardware, alone or under direction of one or more computer programs from a computer-readable storage medium. In some examples, one or more apparatuses may be configured to function as or otherwise implement the system and its components shown and described herein. In examples involving more than one apparatus, the respective apparatuses may be connected to or otherwise in communication with one another in a number of different manners, such as directly or indirectly via a wired or wireless network or the like.

Generally, an apparatus of exemplary implementations of the present disclosure may include at least one processing circuitry alone or in combination with at least one memory or other computer-readable storage media. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits. Examples of suitable processing circuitry include one or more processors, a multi-core processor or some other type of processor, one or more ASICs, FPGAs and the like.

The processing circuitry may be configured to execute computer programs, which may be stored onboard the processing circuitry or otherwise stored in a memory or other computer-readable storage medium. In this regard, a computer-readable storage medium is generally any piece of computer hardware that is capable of storing information such as, for example, data, computer programs and/or other suitable information either on a temporary basis and/or a permanent basis. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In various examples, the apparatus may also include one or more interfaces for displaying, transmitting and/or receiving information. The interfaces may include a communications interface configured to transmit and/or receive information, such as to and/or from other apparatus(es), network(s) or the like. Additionally or alternatively, the one or more interfaces may include one or more user interfaces, such as a display and/or one or more user input interfaces. The display may be configured to present or otherwise display information to a user. The user input interfaces may be configured to receive information from a user into the apparatus, such as for processing, storage and/or display.

As explained above and reiterated below, the present disclosure includes, without limitation, the following example implementations.

Clause 1. An apparatus for providing a positioning, navigation, and timing (PNT) service using a mesh network of interconnected nodes that includes a constellation of satellites, the constellation of satellites including one or more broadcast satellites, the apparatus comprising: at least one memory configured to store computer-readable program code; and at least one processing circuitry configured to access the at least one memory, and execute the computer-readable program code to cause the apparatus to at least: generate one or more pseudorandom noise (PRN) codes for the one or more broadcast satellites, the one or more PRN codes generated at an originating node of the mesh network; and at or from the originating node, map time-registration metadata for the one or more PRN codes; and route the one or more PRN codes with the time-registration metadata through the mesh network to the one or more broadcast satellites, at which the one or more PRN codes are time-registered based on broadcast satellite time and the time-registration metadata and modulated onto a carrier to produce one or more PNT signals for broadcast and receipt by a user equipment designed to use the one or more PNT signals and any number of other PNT signals to calculate a geographical position and user clock solution.

Clause 2. The apparatus of clause 1, wherein the one or more PRN codes are generated at the originating node that is located on the ground.

Clause 3. The apparatus of clause 1 or clause 2, wherein the one or more PRN codes that are generated are Global Positioning System (GPS) M-code or Y-code.

Clause 4. The apparatus of any of clauses 1 to 3, wherein the one or more PRN codes are generated based on a system model used to replicate an orbit and clock of the one or more broadcast satellites, and the apparatus caused to route the one or more PRN codes with the time-registration metadata includes the apparatus caused to meter the one or more PRN codes with the time-registration metadata for receipt at the one or more broadcast satellites just in time for broadcast.

Clause 5. The apparatus of any of clauses 1 to 4, wherein the at least one processing circuitry is configured to execute the computer-readable program code to cause the apparatus to further embed the time-registration metadata with the one or more PRN codes, and wherein the one or more PRN codes are routed including the time-registration metadata embedded with the one or more PRN codes.

Clause 6. The apparatus of any of clauses 1 to 5, wherein the at least one processing circuitry is configured to execute the computer-readable program code to cause the apparatus to further encrypt the one or more PRN codes with the time-registration metadata before the one or more PRN codes with the time-registration metadata are routed to the one or more broadcast satellites.

Clause 7. An apparatus for providing a positioning, navigation, and timing (PNT) service using a mesh network of interconnected nodes that includes a constellation of satellites, the apparatus comprising: at least one memory configured to store computer-readable program code; and at least one processing circuitry configured to access the at least one memory, and execute the computer-readable program code to cause the apparatus to at least: receive a pseudorandom noise (PRN) code with time-registration metadata at a broadcast satellite of the constellation of satellites, the PRN code with the time-registration metadata routed through the mesh network from an originating node of the mesh network to the broadcast satellite; time-register the PRN code based on broadcast satellite time and the time-registration metadata; modulate the time-registered PRN code onto a carrier to produce a PNT signal for the broadcast satellite; and broadcast the PNT signal for receipt by a user equipment designed to use the PNT signal and any number of other PNT signals to calculate a geographical position and user clock solution.

Clause 8. The apparatus of clause 7, wherein the PRN code that is received is Global Positioning System (GPS) M-code or Y-code.

Clause 9. The apparatus of clause 7 or clause 8, wherein the PRN code with the time-registration metadata as received is encrypted, and the at least one processing circuitry is configured to execute the computer-readable program code to cause the apparatus to further decrypt the PRN code with the time-registration metadata before the PRN code is time-registered and modulated onto the carrier to produce the PNT signal.

Clause 10. The apparatus of any of clauses 7 to 9, wherein the PNT service is dual-use, and the at least one processing circuitry is configured to execute the computer-readable program code to cause the apparatus to further broadcast second PNT signals for receipt by the user equipment, the second PNT signals including commercially-proprietary or civil onboard-generated ranging codes.

Clause 11. The apparatus of any of clauses 7 to 10, wherein the PRN code and the carrier are coherently synchronized to each other.

Clause 12. A method of providing a positioning, navigation, and timing (PNT) service using a mesh network of interconnected nodes that includes a constellation of satellites, the constellation of satellites including one or more broadcast satellites, the method comprising: generating one or more pseudorandom noise (PRN) codes for the one or more broadcast satellites, the one or more PRN codes generated at an originating node of the mesh network; and at or from the originating node, mapping time-registration metadata for the one or more PRN codes; and routing the one or more PRN codes with the time-registration metadata through the mesh network to the one or more broadcast satellites, at which the one or more PRN codes are time-registered based on broadcast satellite time and the time-registration metadata and modulated onto a carrier to produce one or more PNT signals for broadcast and receipt by a user equipment designed to use the one or more PNT signals and any number of other PNT signals to calculate a geographical position and user clock solution.

Clause 13. The method of clause 12, wherein the one or more PRN codes are generated at the originating node that is located on the ground.

Clause 14. The method of clause 12 or clause 13, wherein the one or more PRN codes that are generated are Global Positioning System (GPS) M-code or Y-code.

Clause 15. The method of any of clauses 12 to 14, wherein the one or more PRN codes are generated based on a system model used to replicate an orbit and clock of the one or more broadcast satellites, and routing the one or more PRN codes with the time-registration metadata includes metering the one or more PRN codes with the time-registration metadata for receipt at the one or more broadcast satellites just in time for broadcast.

Clause 16. The method of any of clauses 12 to 15, wherein the method further comprises embedding the time-registration metadata with the one or more PRN codes, and wherein the one or more PRN codes are routed including the time-registration metadata embedded with the one or more PRN codes.

Clause 17. The method of any of clauses 12 to 16, wherein the method further comprises encrypting the one or more PRN codes with the time-registration metadata before the one or more PRN codes with the time-registration metadata are routed to the one or more broadcast satellites.

Clause 18. A method of providing a positioning, navigation, and timing (PNT) service using a mesh network of interconnected nodes that includes a constellation of satellites the method comprising: receiving a pseudo-random noise (PRN) code with time-registration metadata at a broadcast satellite of the constellation of satellites, the PRN code with the time-registration metadata routed through the mesh network from an originating node of the mesh network to the broadcast satellite; time-registering the PRN code based on broadcast satellite time and the time-registration metadata; modulating the time-registered PRN code onto a carrier to produce a PNT signal for the broadcast satellite; and broadcasting the PNT signal for receipt by a user equipment designed to use the PNT signal and any number of other PNT signals to calculate a geographical position and user clock solution.

Clause 19. The method of clause 18, wherein the PRN code that is received is Global Positioning System (GPS) M-code or Y-code.

Clause 20. The method of clause 18 or clause 19, wherein the PRN code with the time-registration metadata as received is encrypted, and the method further comprises decrypting the PRN code with the time-registration metadata before the PRN code is time-registered and modulated onto the carrier to produce the PNT signal.

Clause 21. The method of any of clauses 18 to 20, wherein the PNT service is dual-use, and the method further comprises broadcasting second PNT signals for receipt by the user equipment, the second PNT signals including commercially-proprietary or civil onboard-generated ranging codes.

Clause 22. The method of any of clauses 18 to 21, wherein the PRN code and the carrier are coherently synchronized to each other.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for providing a positioning, navigation, and timing (PNT) service using a mesh network of interconnected nodes that includes a constellation of satellites, the constellation of satellites including one or more broadcast satellites, the apparatus comprising:

at least one memory configured to store computer-readable program code; and at least one processing circuitry configured to access the at least one memory, and execute the computer-readable program code to cause the apparatus to at least:

generate one or more pseudorandom noise (PRN) codes for the one or more broadcast satellites, the one or more PRN codes generated at an originating node of the mesh network; and at or from the originating node, map time-registration metadata for the one or more PRN codes; and route the one or more PRN codes with the time-registration metadata through the mesh network to the one or more broadcast satellites, at which the one or more PRN codes are time-registered based on broadcast satellite time and the time-registration metadata and modulated onto a carrier to produce one or more PNT signals for broadcast and receipt by a user equipment designed to use the one or more PNT signals and any number of other PNT signals to calculate a geographical position and user clock solution.

2. The apparatus of claim 1, wherein the one or more PRN codes are generated at the originating node that is located on the ground.

3. The apparatus of claim 1, wherein the one or more PRN codes that are generated are Global Positioning System (GPS) M-code or Y-code.

4. The apparatus of claim 1, wherein the one or more PRN codes are generated based on a system model used to replicate an orbit and clock of the one or more broadcast satellites, and the apparatus caused to route the one or more PRN codes with the time-registration metadata includes the apparatus caused to meter the one or more PRN codes with the time-registration metadata for receipt at the one or more broadcast satellites just in time for broadcast.

5. The apparatus of claim 1, wherein the at least one processing circuitry is configured to execute the computer-readable program code to cause the apparatus to further embed the time-registration metadata with the one or more PRN codes, and wherein the one or more PRN codes are routed including the time-registration metadata embedded with the one or more PRN codes.

6. The apparatus of claim 1, wherein the at least one processing circuitry is configured to execute the computer-readable program code to cause the apparatus to further encrypt the one or more PRN codes with the time-registration metadata before the one or more PRN codes with the time-registration metadata are routed to the one or more broadcast satellites.

7. An apparatus for providing a positioning, navigation, and timing (PNT) service using a mesh network of interconnected nodes that includes a constellation of satellites, the apparatus comprising:

at least one memory configured to store computer-readable program code; and at least one processing circuitry configured to access the at least one memory, and execute the computer-readable program code to cause the apparatus to at least:

receive a pseudorandom noise (PRN) code with time-registration metadata at a broadcast satellite of the constellation of satellites, the PRN code with the time-registration metadata routed through the mesh network from an originating node of the mesh network to the broadcast satellite;

time-register the PRN code based on broadcast satellite time and the time-registration metadata;

modulate the time-registered PRN code onto a carrier to produce a PNT signal for the broadcast satellite; and broadcast the PNT signal for receipt by a user equipment designed to use the PNT signal and any number of other PNT signals to calculate a geographical position and user clock solution.

8. The apparatus of claim 7, wherein the PRN code that is received is Global Positioning System (GPS) M-code or Y-code.

9. The apparatus of claim 7, wherein the PRN code with the time-registration metadata as received is encrypted, and the at least one processing circuitry is configured to execute the computer-readable program code to cause the apparatus to further decrypt the PRN code with the time-registration metadata before the PRN code is time-registered and modulated onto the carrier to produce the PNT signal.

10. The apparatus of claim 7, wherein the PNT service is dual-use, and the at least one processing circuitry is configured to execute the computer-readable program code to cause the apparatus to further broadcast second PNT signals for receipt by the user equipment, the second PNT signals including commercially-proprietary or civil onboard-generated ranging codes.

11. The apparatus of claim 7, wherein the PRN code and the carrier are coherently synchronized to each other.

12. A method of providing a positioning, navigation, and timing (PNT) service using a mesh network of interconnected nodes that includes a constellation of satellites, the constellation of satellites including one or more broadcast satellites, the method comprising:

generating one or more pseudorandom noise (PRN) codes for the one or more broadcast satellites, the one or more PRN codes generated at an originating node of the mesh network; and at or from the originating node, mapping time-registration metadata for the one or more PRN codes; and routing the one or more PRN codes with the time-registration metadata through the mesh network to the one or more broadcast satellites, at which the one or more PRN codes are time-registered based on broadcast satellite time and the time-registration metadata and modulated onto a carrier to produce one or more PNT signals for broadcast and receipt by a user equipment designed to use the one or more PNT signals and any number of other PNT signals to calculate a geographical position and user clock solution.

13. The method of claim 12, wherein the one or more PRN codes are generated at the originating node that is located on the ground.

14. The method of claim 12, wherein the one or more PRN codes that are generated are Global Positioning System (GPS) M-code or Y-code.

15. The method of claim 12, wherein the one or more PRN codes are generated based on a system model used to replicate an orbit and clock of the one or more broadcast satellites, and routing the one or more PRN codes with the time-registration metadata includes metering the one or more PRN codes with the time-registration metadata for receipt at the one or more broadcast satellites just in time for broadcast.

16. The method of claim 12, wherein the method further comprises embedding the time-registration metadata with the one or more PRN codes, and wherein the one or more PRN codes are routed including the time-registration metadata embedded with the one or more PRN codes.

17. The method of claim 12, wherein the method further comprises encrypting the one or more PRN codes with the time-registration metadata before the one or more PRN codes with the time-registration metadata are routed to the one or more broadcast satellites.

18. A method of providing a positioning, navigation, and timing (PNT) service using a mesh network of interconnected nodes that includes a constellation of satellites the method comprising:

receiving a pseudorandom noise (PRN) code with time-registration metadata at a broadcast satellite of the constellation of satellites, the PRN code with the time-registration metadata routed through the mesh network from an originating node of the mesh network to the broadcast satellite;

time-registering the PRN code based on broadcast satellite time and the time-registration metadata;

modulating the time-registered PRN code onto a carrier to produce a PNT signal for the broadcast satellite; and broadcasting the PNT signal for receipt by a user equipment designed to use the PNT signal and any number of other PNT signals to calculate a geographical position and user clock solution.

19. The method of claim 18, wherein the PRN code that is received is Global Positioning System (GPS) M-code or Y-code.

20. The method of claim 18, wherein the PRN code with the time-registration metadata as received is encrypted, and the method further comprises decrypting the PRN code with the time-registration metadata before the PRN code is time-registered and modulated onto the carrier to produce the PNT signal.

21. The method of claim 18, wherein the PNT service is dual-use, and the method further comprises broadcasting second PNT signals for receipt by the user equipment, the second PNT signals including commercially-proprietary or civil onboard-generated ranging codes.

22. The method of claim 18, wherein the PRN code and the carrier are coherently synchronized to each other.

* * * * *